United States Patent
Pawlik et al.

(10) Patent No.: US 9,162,513 B2
(45) Date of Patent: Oct. 20, 2015

(54) METHOD OF AUTHENTICATING AN ITEM

(71) Applicant: Eastman Kodak Company, Rochester, NY (US)

(72) Inventors: Thomas D. Pawlik, Rochester, NY (US); Judith A. Bose, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 173 days.

(21) Appl. No.: 13/949,304

(22) Filed: Jul. 24, 2013

(65) Prior Publication Data

US 2015/0028578 A1   Jan. 29, 2015

(51) Int. Cl.
| | |
|---|---|
| *B42D 25/387* | (2014.01) |
| *B42D 25/30* | (2014.01) |
| *G06K 7/12* | (2006.01) |
| *G07D 7/12* | (2006.01) |
| *G07D 7/20* | (2006.01) |
| *G06K 19/06* | (2006.01) |

(52) U.S. Cl.
CPC ............. *B42D 25/30* (2014.10); *B42D 25/387* (2014.10); *G06K 7/12* (2013.01); *G07D 7/121* (2013.01); *G07D 7/128* (2013.01); *G07D 7/2066* (2013.01); *G06K 2019/06225* (2013.01)

(58) Field of Classification Search
CPC ...................................................... B42D 25/387
USPC ............................................................. 283/89
See application file for complete search history.

(56) References Cited

U.S. PATENT DOCUMENTS

| | | | |
|---|---|---|---|
| 8,323,780 B1 * | 12/2012 | Simske et al. .................. 283/87 |
| 2004/0180213 A1 * | 9/2004 | Harris et al. ................ 428/423.1 |
| 2006/0196948 A1 * | 9/2006 | Weber et al. ................... 235/491 |
| 2009/0007815 A1 * | 1/2009 | Hampden-Smith et al. ........................... 106/31.13 |
| 2009/0104373 A1 | 4/2009 | Vanbesien et al. |
| 2010/0062194 A1 * | 3/2010 | Sun ................................ 428/29 |
| 2012/0248758 A1 * | 10/2012 | O'Donoghue et al. ......... 283/85 |

FOREIGN PATENT DOCUMENTS

| | | | |
|---|---|---|---|
| EP | 2246198 | * | 11/2010 |
| WO | WO2010151177 | * | 12/2010 |

* cited by examiner

*Primary Examiner* — Kyle Grabowski
(74) *Attorney, Agent, or Firm* — Nelson Adrian Blish

(57) ABSTRACT

A method of authenticating an item with a security mark includes providing a substrate (100); printing the security mark on the substrate with invisible ultraviolet (UV) absorbing ink (102); applying a coating comprised of UV fluorescent varnish (104) over the security mark and substrate; illuminating an area comprising the security mark and coating with UV light; identifying a reduced fluorescence image of the security mark; comparing the reduced fluorescence image with the security mark; and authenticating the item if the reduced fluorescence image matches the security mark.

20 Claims, 5 Drawing Sheets

METHOD OF AUTHENTICATING AN ITEM

CROSS REFERENCE TO RELATED APPLICATIONS

Reference is made to commonly-assigned copending U.S. patent application Ser. No. 13/896,582 (now U.S. Publication No. 2014/0339807), filed May 17, 2013, entitled METHOD FOR AUTHENTICATING UV ABSORBING SECURITY MARK, by Pawlik et al.; and U.S. patent application Ser. No. 13/949,312 (now U.S. Publication No. 2015/0028227), filed Jul. 24, 2013, entitled SYSTEM FOR AUTHENTICATING AN ITEM, by Pawlik et al.; the disclosures of which are incorporated herein.

FIELD OF THE INVENTION

This invention relates to security marks printed with UV absorbent ink on non-fluorescent media with a UV fluorescent overcoat.

BACKGROUND OF THE INVENTION

Applying invisible covert marks to product packaging is a well establish method for authenticating products and thus combating counterfeiting. In addition, when variable invisible information is printed, batch-level and item-level tracking of products can be accomplished in a covert manner. Common covert marking materials are ultraviolet (UV) fluorescent inks. The security mark is invisible under normal lighting, but is revealed when a UV light source is used.

One limitation of this approach is that printed cartons and packaging materials can have a UV curable overprint varnish applied to help improve the durability of the surface, for example add scuff resistance; change the gloss finish of the surface; or protect the inks from unintentionally washing off or intentionally being removed, in the case of covert tracking information. These overprint varnishes (also referred to as overcoat varnishes) typically contain optical brighteners that can interfere with the UV fluorescence of the security marks. One example of such a varnish is InX International Procure™ UV 10090 LP overprint varnish.

U.S. Publication No. 2009/0104373 (Vanbesien) describes applying a radiation curable varnish to a document and authenticating the document via the radiation curable fluorescent varnish. However, in their case the hidden information is applied to the document by image-wise printing of the radiation curable varnish using a digital press. This can pose problems when there is an imperfect match of the gloss of the varnish with the gloss of the substrate which would make the invisible mark visible to the unaided eye as a gloss differential. This is undesirable because it exposes the hidden mark. Digitally printing a radiation curable ink can also pose hardware problems such as jetting of a high viscosity liquid and clogging of inkjet nozzles because of crosslinking of the varnish.

Another way of adding a security mark is to use a UV absorbing ink on a print surface that contains an optical brightener, thereby creating a negative (dark) image. This can work well on label stock, which often has optical brighteners. Typical carton stock used in packaging, however, often does not contain such optical brighteners; therefore this simple approach is not feasible.

It is therefore highly desirable to have a solution that allows covert embedding of information via a robust printing method on substrates that are not optically brightened, and that can also subsequently be treated with an overprint varnish to protect the package.

SUMMARY OF THE INVENTION

Briefly, according to one aspect of the present invention, information (e.g. text, logos, numbers, or barcodes) is printed using a UV-absorbent ink onto the substrate which may be carton stock that does not contain optical brightener, and subsequently a UV curable varnish that fluoresces under UV illumination is applied. If this coating is sufficiently thin, a fraction of UV light will be transmitted. In areas absent of UV absorber, this UV light will be reflected back (assuming a bright surface). The reflected UV light will lead to additional visible fluorescence. In areas with UV absorber, the reflection will be attenuated. Thus, the UV absorber printed mark will appear darker under UV light.

Because the security mark is printed under the UV-cured overcoat, it is very hard to remove. It can be printed using a variable data printer (e.g. inkjet) for a serialized mark.

In one embodiment of the invention, the security mark is printed with a UV absorber which can be easily formulated into a low viscosity inkjet ink, and the overcoat can be applied uniformly using standard offset or flexographic printing techniques. The gloss is therefore uniform across the printed item and the security mark only becomes visible under UV illumination. This is especially useful if variable data are printed. If static information is printed, the UV absorber can be formulated into either an ink jet ink or a conventional flexographic or offset ink.

In a second embodiment of the invention, the security mark is similarly printed using a UV-absorbent ink, but in contrast to the first embodiment, there is either no overcoat varnish applied after printing or the overcoat varnish that is applied does not contain UV fluorescent materials. For authentication, a transparent sheet containing UV fluorescing materials is placed in contact with the carton stock before illuminating with UV light. This approach is useful when a higher level of security is required. Because two devices are required to authenticate, a UV light source and a UV fluorescing transparent sheet, it becomes more difficult for a counterfeiter to detect that a security feature is present and therefore it is not replicated on the counterfeit packaging.

For both embodiments, authentication of the package is accomplished by illuminating the package with a UV light source to visually inspect for the hidden information and comparing the revealed image to a known or expected image. Alternatively, a device (e.g. a mobile phone with a digital camera) can be used to capture the revealed image and compare it to a predetermined image, decode it, or transmit the image data or code to a remote location for comparison to a known or expected image or code that is stored in a database.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
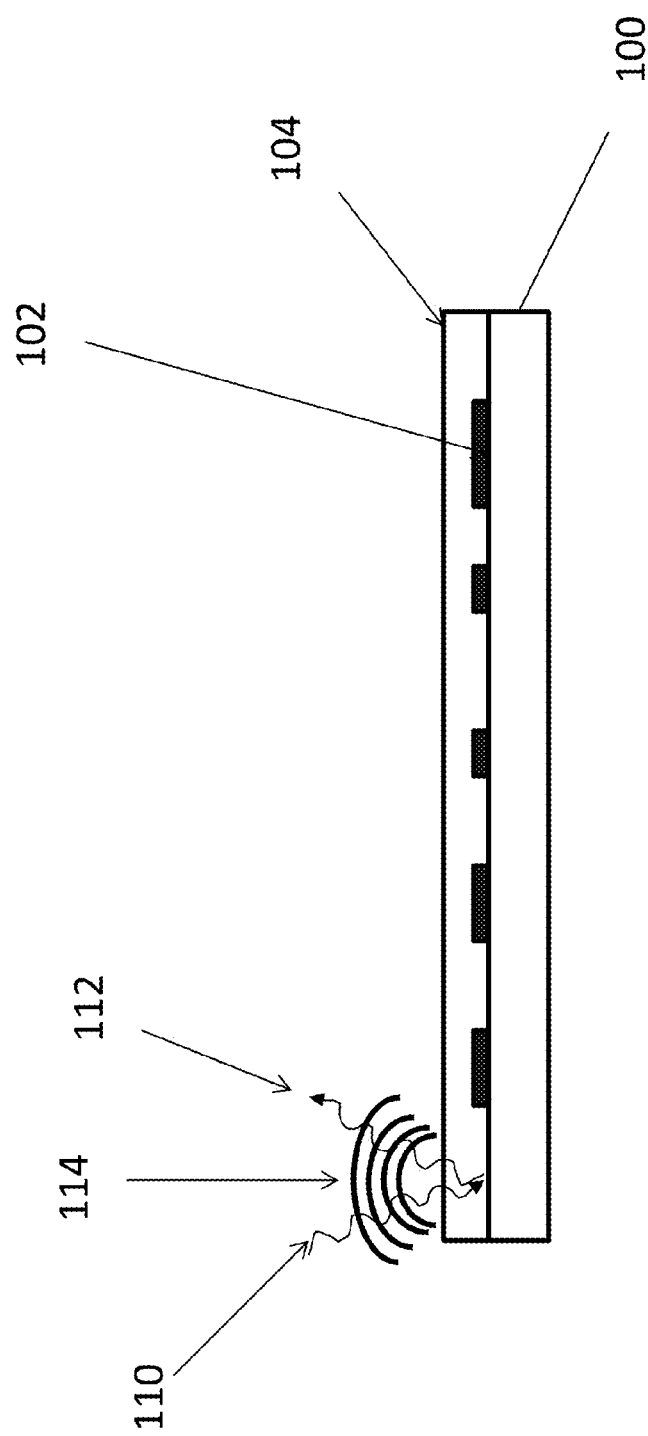
FIG. 1 is a schematic of a substrate with a security mark printed with a UV absorbing ink and a UV fluorescing overcoat layer.

Referring now to FIG. 1, it shows a cross-section of the authentic item comprising a reflective substrate 100 that reflects a substantial fraction of incident radiation. An image comprising a security mark 102 is printed on the substrate using UV absorbing ink. The security mark can be a picture, text, number, logo, barcode, or combinations thereof. UV absorbing inks typically absorb radiation in the 200 nm-to 400 nm range. Examples of UV absorbing ink are available from BASF under the trade name Tinuvin. While most examples of Tinuvin require organic (co-) solvents, there are water-based nanoparticle dispersions available, for example Tinuvin 99-DW (clear) or Tinuvin 477-DW (slight yellow). The printed image is then coated with a varnish 104 that contains UV fluorescent components. Chemical components that exhibit fluorescence under UV irradiation may include fluorescent dyes, fluorescent pigments and inorganic surface functionalized quantum dot materials. Examples of fluorescent dyes suitable for use herein include those belonging to the dye families known as rhodamines, fluorescenes, coumarine, napthalimides, benzoxanthenes, acridines, azos, mixtures thereof and the like. In particular optical brighteners that convert UV radiation to blue visible radiation such as 2,5-Bis (5-tert-butyl-benzoxazol-2-yl) thiophene are suitable materials. Other suitable fluorescent materials are pigments available from Risk Reactor, for example the PFC class, specifically PFC-03 which switches from invisible to red when exposed to UV light; or the PF class, for example PF-09 which switches from invisible to violet when exposed to UV light. Other suppliers of fluorescent materials include Beaver Luminescers from Newton, Mass. and Cleveland Pigment & Color Co. from Akron, Ohio. Some clear varnishes that are cured using UV radiation are also UV fluorescent, for example Flint Group UV LP High Gloss Coating 30# (UVB01073). The coating thickness and composition of the varnish is chosen such that a substantial fraction, ideally between 30% and 70%, of the incident UV illumination is transmitted through the varnish coating and another significant fraction, ideally between 30% and 70%, is absorbed by the UV fluorescent compound and converted to visible light. When the item containing a security mark is illuminated with UV light 110 in an area where no image is printed with UV absorbing ink, the fraction of UV light that is transmitted through the varnish and reflected back as UV light 112. The visible light 114 originates from fluorescence created by UV light that is absorbed by the UV fluorescent compound of the UV fluorescent varnish 104 either through absorption of a fraction of the incident UV light 110 or of the reflected UV light 112.

Figure 2:
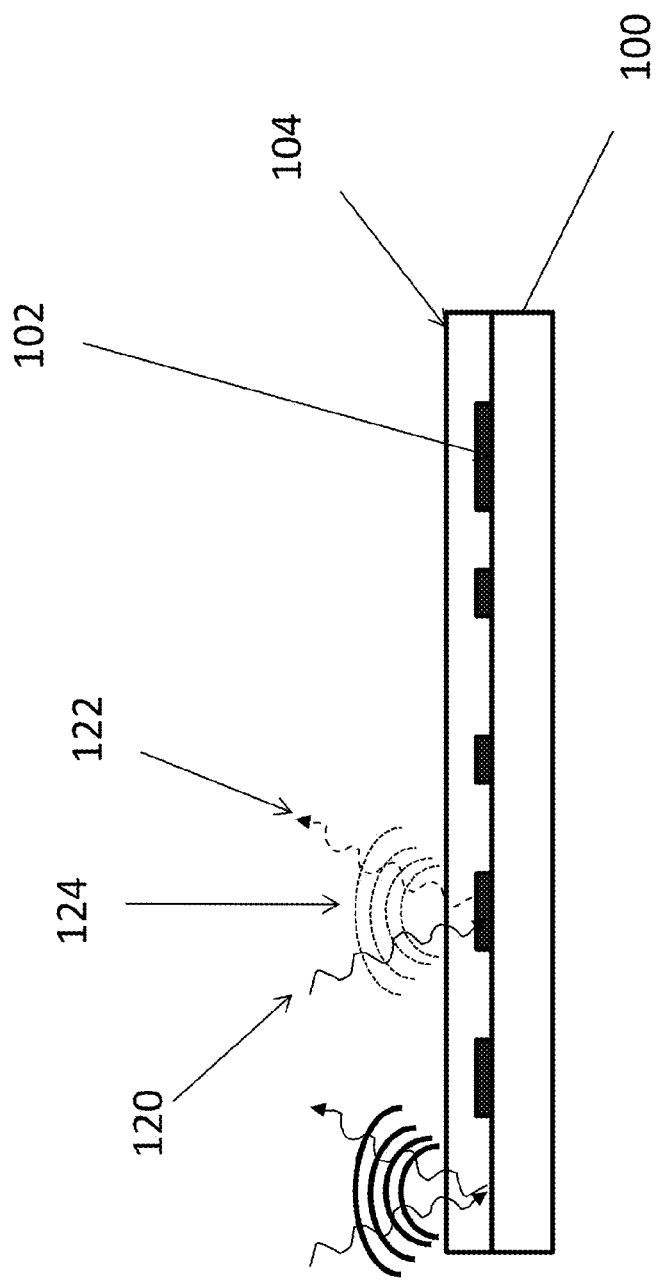
FIG. 2 is a schematic of a substrate with a security mark printed with a UV absorbing ink and a UV fluorescing overcoat layer and depicting the difference in reflected light as a function of the presence or absence of the UV absorber.

Referring now to FIG. 2, which shows the illumination of the security mark with UV light 120 in an area where UV absorbing ink is present as part of the image of the security mark. The composition and coating thickness of the UV absorbing ink is chosen such that a large fraction of the incident UV light, ideally more than 50%, is absorbed. Consequently, the intensity of the reflected UV light 122 is reduced and the total emitted visible fluorescence light 124 is reduced compared to that of 114 in FIG. 1 where no UV absorbing ink was present. This intensity difference is visible to the eye. Consequently, the image printed with UV absorbing ink that is invisible to the eye under normal (non UV-containing) illumination will become visible under UV illumination. The image itself can be a picture, number, text, logo, barcode or combinations thereof.

Figure 3:
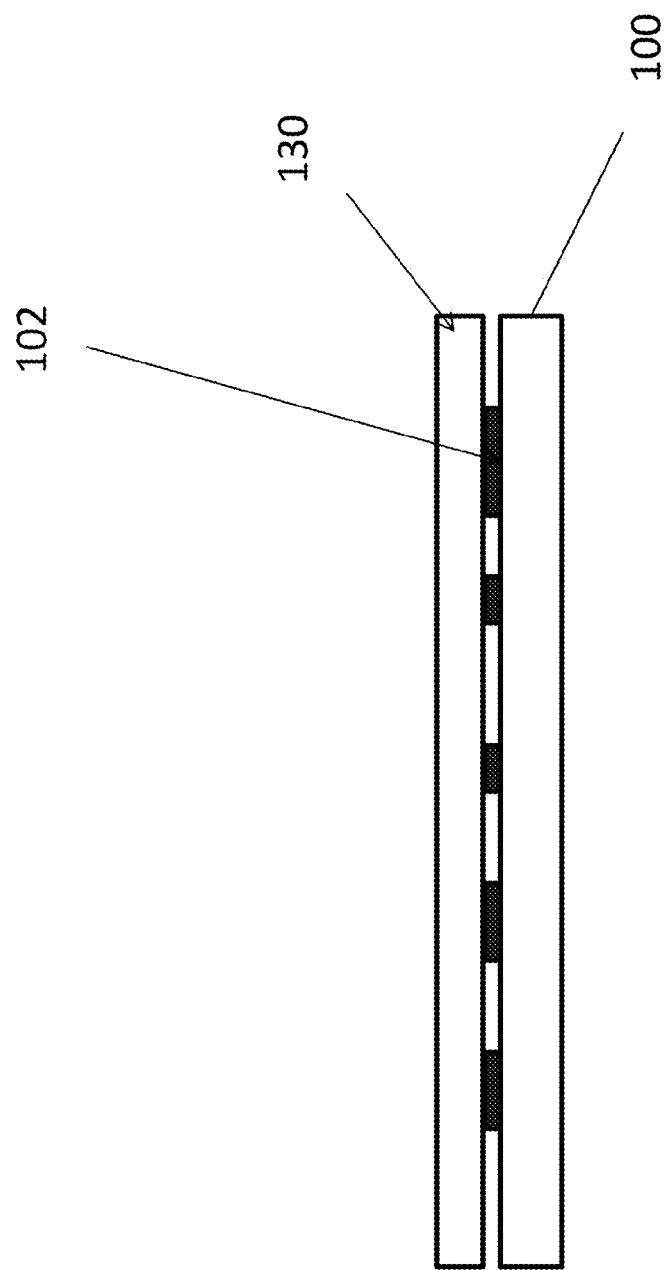
FIG. 3 is a schematic of a substrate with a security mark printed with a UV absorbing ink and a UV fluorescing transparent sheet.

FIG. 3 shows a variant of this invention where the UV fluorescent compounds are part of a separate transparent sheet 130. This sheet is transparent to visible light, but absorbs a fraction of incident UV light and emits visible fluorescence light. The authentic item only consists of a substrate 100, the security mark printed with UV absorbing ink 102 and optionally a clear varnish without UV fluorescent compounds (not shown in FIG. 3). Under UV illumination this security mark will not be visible to the eye because the eye is not sensitive to UV light and there are no UV fluorescent compounds in the authentic item that would convert the UV light to visible light. Only when the transparent sheet 130 that contains UV fluorescent compounds is placed in contact with the authentic item and illuminated with UV light will the security mark printed with UV absorbing ink become visible. The transparent UV fluorescent sheet 130 acts as a key to unlock the security mark.

Authentication of the item is accomplished by illuminating the item with a UV light source to visually inspect for the reduced fluorescence image of the security mark and comparing the revealed mark to a known or expected mark or image. Alternatively, a device (e.g. a mobile phone with a digital camera) can be used to capture the reduced fluorescence image of the security mark and compare it to a predetermined image, decode it, or transmit the image of the security mark or code to a remote location for comparison to a known or expected image or code. For example, if the security mark is an item-level serial number, the serial number can be transmitted to a remote server containing a database and then cross referenced in the database to either verify the serial number is valid or ascertain additional information associated with that specific item, for example its expected location in the distribution chain. The outcome of the remote authentication step can be transmitted back to the original transmitting device.

Figure 4:
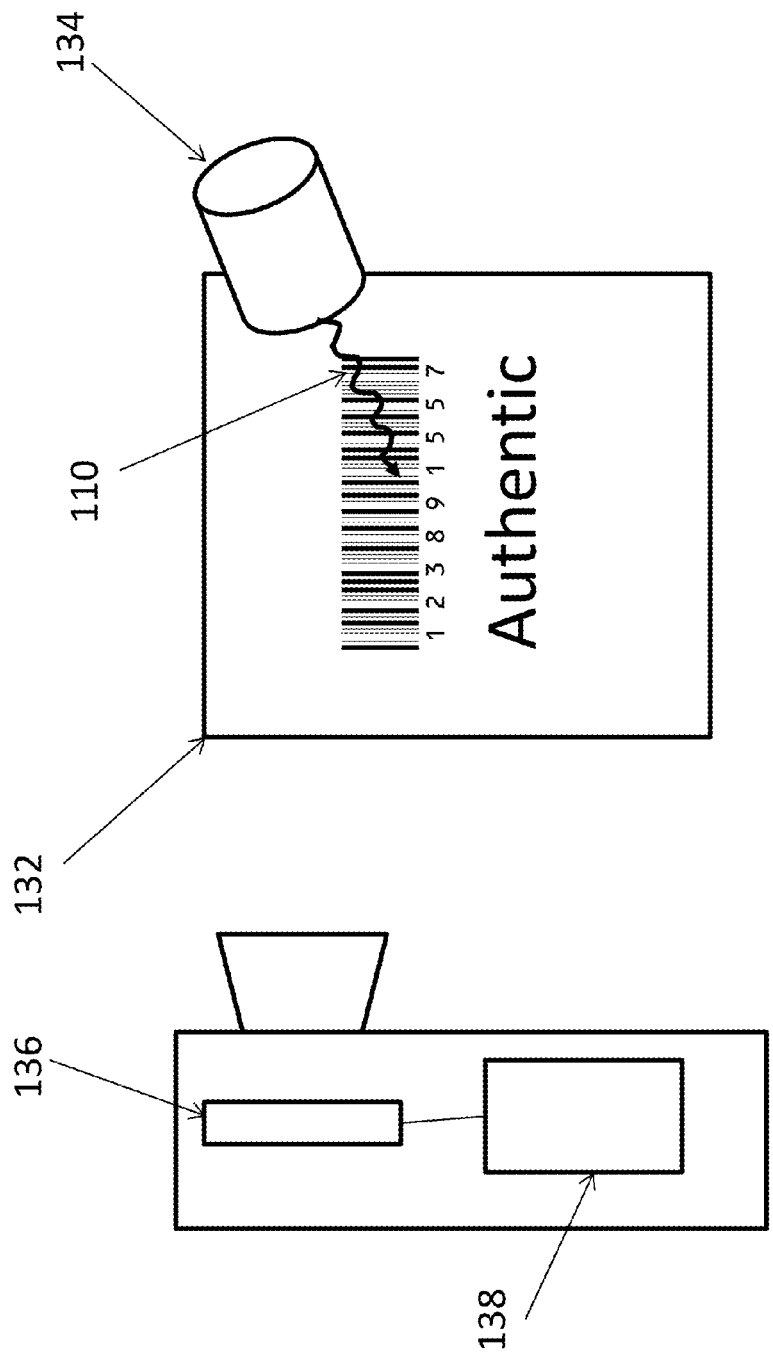
FIG. 4 is a schematic showing the concept of capturing and processing the image of the security mark using an image sensor and a microprocessor.

Referring now to FIG. 4, which shows the security mark of the authentic item 132 being revealed under illumination with UV light 110 from a UV illuminator 134. The image of the security mark is captured with an image sensor 136 and the image data is processed by a microprocessor 138. The microprocessor can, for example, compare the captured image to a predetermined image and base the authentication of the item on the result of the image comparison. Alternatively, the microprocessor can decode the image information if it is a machine readable code such as a barcode.

Figure 5:
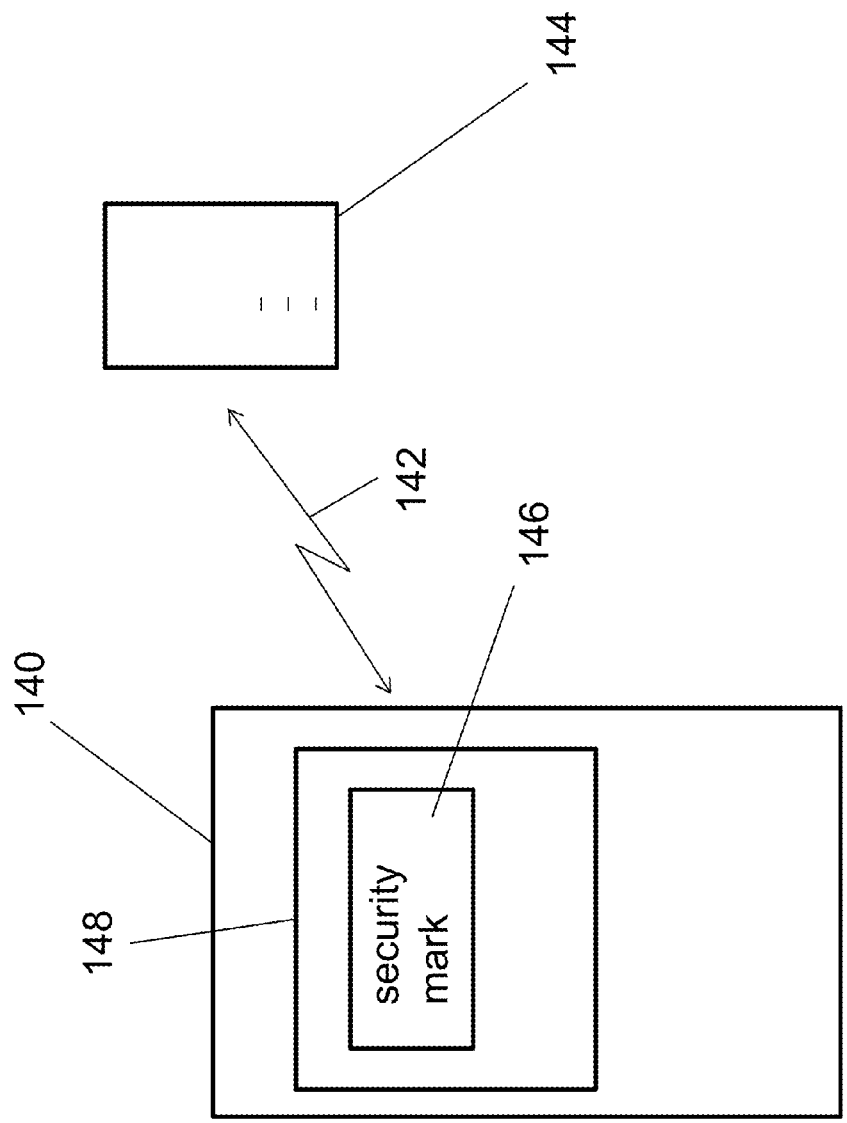
FIG. 5 is a schematic showing the concept of transmitting information to a remote location for authentication.

Referring now to FIG. 5, once revealed with UV illumination, a mobile device with a digital camera 140, for example a smart phone, can capture an image of the security mark 146 and transmit the image data or a code derived from the image data via a network 142 to a remote server 144 for authentication. The result of the authentication can be displayed on the device's display 148.

The invention has been described in detail with particular reference to certain preferred embodiments thereof, but it will be understood that variations and modifications can be effected within the scope of the invention.

PARTS LIST 100 substrate
102 security mark printed with UV-absorbing ink
104 UV fluorescent varnish
110 UV light illuminating print media
112 UV light reflected from print media
114 visible fluorescence light emitted from varnish
120 UV light illuminating security mark
122 UV light reflected from security mark
124 visible fluorescence light emitted from varnish
130 UV fluorescent transparent sheet
132 authentic item
134 UV illuminator
136 image sensor
138 microprocessor
140 mobile device with digital camera (smart phone)
142 network
144 remote server
146 security mark/hidden information
148 display

The invention claimed is:

1. A method of authenticating an item with a security mark comprising:
    providing a substrate;
    printing the security mark on the substrate with invisible ultraviolet (UV) absorbing ink;
    applying a coating comprised of a clear, UV fluorescent varnish, transparent in the visible spectrum, over the security mark and substrate;
    illuminating an area comprising the security mark and coating with UV light;
    identifying a reduced fluorescence image of the security mark;
    comparing the reduced fluorescence image with the security mark; and
    authenticating the item if the reduced fluorescence image matches the security mark.

2. The method of claim 1 wherein the security mark consists of a picture, text, number, logo, barcode, or combinations thereof.

3. The method of claim 2 wherein the security mark is comprised of variable information consisting of a picture, text, number, logo, barcode, or combinations thereof.

4. The method of claim 1 wherein the coating is comprised of UV fluorescent varnish transmits from 10% to 90% of ultraviolet light.

5. The method of claim 4 wherein in the coating is comprised of UV fluorescent varnish transmits from 30% to 70% of ultraviolet light.

6. The method of claim 1 wherein the material comprising the security mark absorbs light having a wavelength between 200-400 nm.

7. The method of claim 1 wherein the substrate reflects at least 50% percent of the UV radiation transmitted by the coating.

8. The method of claim 1 wherein authentication is by visual matching.

9. The method of claim 1 wherein authentication comprises:
    capturing an image of the reduced fluorescence image on an image sensor; and
    comparing the reduced fluorescence image to a predetermined image using a microprocessor.

10. The method of claim 9 further comprising:
    transmitting the reduced fluorescence image to a remote location for comparison and authentication.

11. A method of authenticating an item with a security mark comprising:
    providing a substrate;
    printing the security mark on the substrate with ultraviolet (UV) absorbing ink;
    placing a transparent sheet comprising a UV fluorescent material, transparent in the visible spectrum, over the security mark and substrate;
    illuminating an area comprising the security mark and sheet with UV light;
    identifying a reduced fluorescence image of the security mark;
    comparing the reduced fluorescence image with the security mark; and
    authenticating the item if the reduced fluorescence image matches the security mark.

12. The method of claim 11 wherein the security mark consists of a picture, text, number, logo, barcode, or combinations thereof.

13. The method of claim 11 wherein the UV fluorescent sheet transmits from 10% to 90% of ultraviolet light.

14. The method of claim 13 wherein in the UV fluorescent sheet transmits from 30% to 70% of ultraviolet light.

15. The method of claim 11 wherein the material comprising the security mark absorbs light having a wavelength between 200-400 nm.

16. The method of claim 11 wherein the substrate reflects at least 50% percent of the UV radiation transmitted by the coating.

17. The method of claim 11 wherein authentication is by visual matching.

18. The method of claim 11 wherein authentication comprises:
    capturing an image of the reduced fluorescence image on an image sensor; and
    comparing the reduced fluorescence image to a predetermined image using a microprocessor.

19. A method of authenticating an item with a security mark comprising:
    providing a substrate;
    printing the security mark on the substrate with ultraviolet (UV) absorbing ink; and
    placing a transparent sheet or a clear varnish comprising a UV fluorescent material, transparent in the visible spectrum, over the security mark and substrate.

20. The method of claim 19 further comprising:
    illuminating an area comprising the security mark and sheet or coating with UV light;
    identifying a reduced fluorescence image of the security mark;
    comparing the reduced fluorescence image with the security mark; and
    authenticating the item if the reduced fluorescence image matches the security mark.

* * * * *